United States Patent [19]

Greatbatch et al.

[11] 4,164,070

[45] Aug. 14, 1979

[54] METHOD OF MAKING A LITHIUM-BROMINE CELL

[75] Inventors: Wilson Greatbatch, Clarence; Ralph T. Mead, Kenmore; Robert L. McLean, Clarence; Frank W. Rudolph, Depew; Norbert W. Frenz, North Tonawanda, all of N.Y.

[73] Assignee: Eleanor & Wilson Greatbatch Foundation, Akron, N.Y.

[21] Appl. No.: 861,527

[22] Filed: Dec. 19, 1977

Related U.S. Application Data

[60] Division of Ser. No. 722,653, Sep. 16, 1976, Pat. No. 4,105,833, which is a continuation-in-part of Ser. No. 617,280, Sep. 29, 1975, Pat. No. 3,994,747.

[51] Int. Cl.$^2$ .............................................. H01M 4/36
[52] U.S. Cl. .................................................. 29/623.2
[58] Field of Search ............... 29/623.2, 623.1, 422; 429/199, 218, 104, 102, 191, 181, 178, 103

[56] References Cited

U.S. PATENT DOCUMENTS

| | | | |
|---|---|---|---|
| 3,723,183 | 3/1973 | Greatbatch | 429/199 |
| 3,868,273 | 2/1975 | Will et al. | 429/101 |
| 3,874,929 | 4/1975 | Greatbatch | 429/171 |
| 3,928,071 | 12/1975 | Thornton | 429/218 |
| 3,944,433 | 3/1976 | Mead et al. | 429/218 |
| 3,945,846 | 3/1976 | Dey | 429/218 |
| 3,957,533 | 5/1976 | Mead et al. | 429/213 |
| 3,976,503 | 8/1976 | Minck et al. | 429/104 |

Primary Examiner—C. W. Lanham
Assistant Examiner—Daniel C. Crane
Attorney, Agent, or Firm—Christel, Bean & Linihan

[57] ABSTRACT

A lithium-bromine cell comprising a casing which can be of electrically conducting material and containing a lithium anode element from which a sealed conductor extends through the casing. A filling element which can be of electrically conducting material and which has a passage therethrough is fixed to the sealed casing with one end of the passage in communication with the interior of the casing and the other end externally exposed. Bromine is introduced through the passage to the interior of the casing into operative relationship with the lithium anode whereupon the passage is closed to complete the cell. The electrically conducting casing serves as a cathode current collector in operative contact with the bromine cathode, and after closing of the passage the electrically conducting filling element serves as an electrical terminal for the cell. An electrical potential difference exists between the terminal and the anode conductor during operation of the cell.

14 Claims, 7 Drawing Figures

METHOD OF MAKING A LITHIUM-BROMINE CELL

CROSS REFERENCE TO RELATED APPLICATIONS

This application is a division of application Ser. No. 722,653 filed Sept. 16, 1976 entitled "Lithium-Bromine Cell and Method of Making The Same", now U.S. Pat. No. 4,105,833 issued Aug. 8, 1978, a continuation-in-part of application Ser. No. 617,280 entitled "Lithium-Bromine Cell" filed Sept. 29, 1975, now U.S. Pat. No. 3,994,747 issued Nov. 30, 1976.

BACKGROUND OF THE INVENTION

This invention relates to the conversion of chemical energy to electrical energy, and more particularly to a new and improved lithium-bromine cell and method of making the same.

In the development of solid electrolyte batteries, lithium is recognized as a very desirable material for the negative electrode, i.e. the anode on discharge, in a non-aqueous cell. The cell of the present invention includes a lithium anode and a bromine cathode to utilize the desirable characteristics of bromine, among which are a significant degree of chemical activity, a moderately low molecular weight, and a significant level of energy density. In making a lithium-bromine cell, it is necessary to consider, among other factors, that bromine normally is in the form of a liquid which emits vapors.

SUMMARY OF THE INVENTION

It is, therefore, an object of this invention to provide a new and improved lithium-bromine cell and method of making the same.

It is a further object of this invention to provide a lithium-bromine cell of relatively high energy density.

It is a further object of this invention to provide a lithium-bromine cell which is relatively simple in construction It is a further object of this invention to provide a method of making a lithium-bromine cell which employs bromine in its natural form.

It is a further object of this invention to provide a method of making a lithium-bromine cell which is efficient, effective and relatively easy to perform.

The present invention provides a lithium-bromine cell and method of making the same wherein a lithium anode is placed in a casing, a filling element is provided having a passage therethrough, and the casing is sealed in a manner such that the filling element, is fixed to the casing with one end of the passage in communication with the interior of the casing and the other end externally exposed. Bromine is introduced through the passage in the filling element to the interior of the casing into operative relationship with the lithium anode whereupon the filling element passage is closed and the cell is completed. The casing and the filling element can be of electrically conducting material, the bromine cathode can be in operative contact with the casing in a manner such that the casing serves as a cathode current collector, and after closing of the passage the filling element serves as an electrical terminal for the cell.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
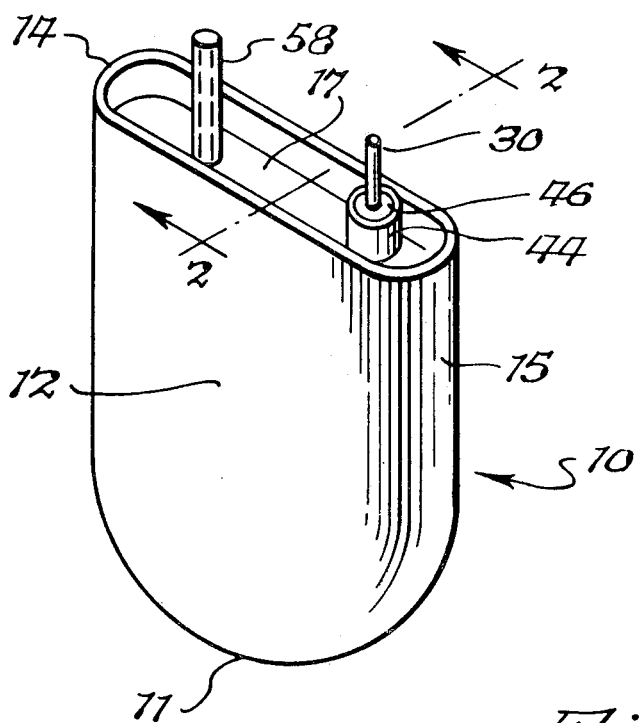
FIG. 1 is a perspective view of a lithium-bromine cell according to the present invention.

Referring now to FIG. 1, a lithium-bromine cell according to the present invention comprises a casing 10 of metal such as stainless steel which preferably is shaped or otherwise formed to be hollow and generally rectangular in shape of an integral construction including a curved bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound curvature in that it is curved both in a direction between the side wall portions 12, 13 and also is curved in a direction between the end wall portions 14, 15. This latter curvature of bottom portion 11 is of the same degree as the curvature of the end wall portions 14, 15 thereby defining a continuous, curved surface around along the casing. The side wall portions 12, 13 are generally parallel. The casing has an opened top or end opposite the bottom portion 11 which is sealed closed by means of a lid 17 also of metal such as stainless steel.

Figure 2:
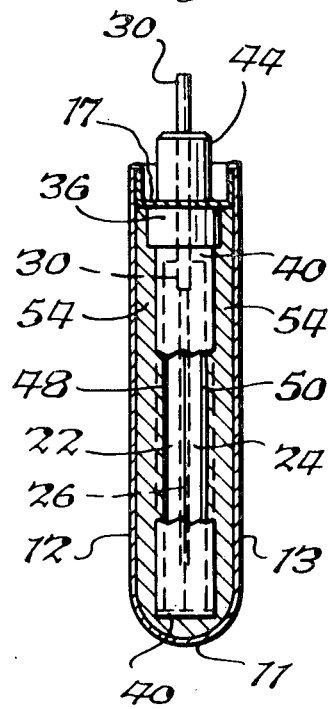
FIG. 2 is a sectional view taken about on line 2—2 in FIG. 1.
Figure 3:
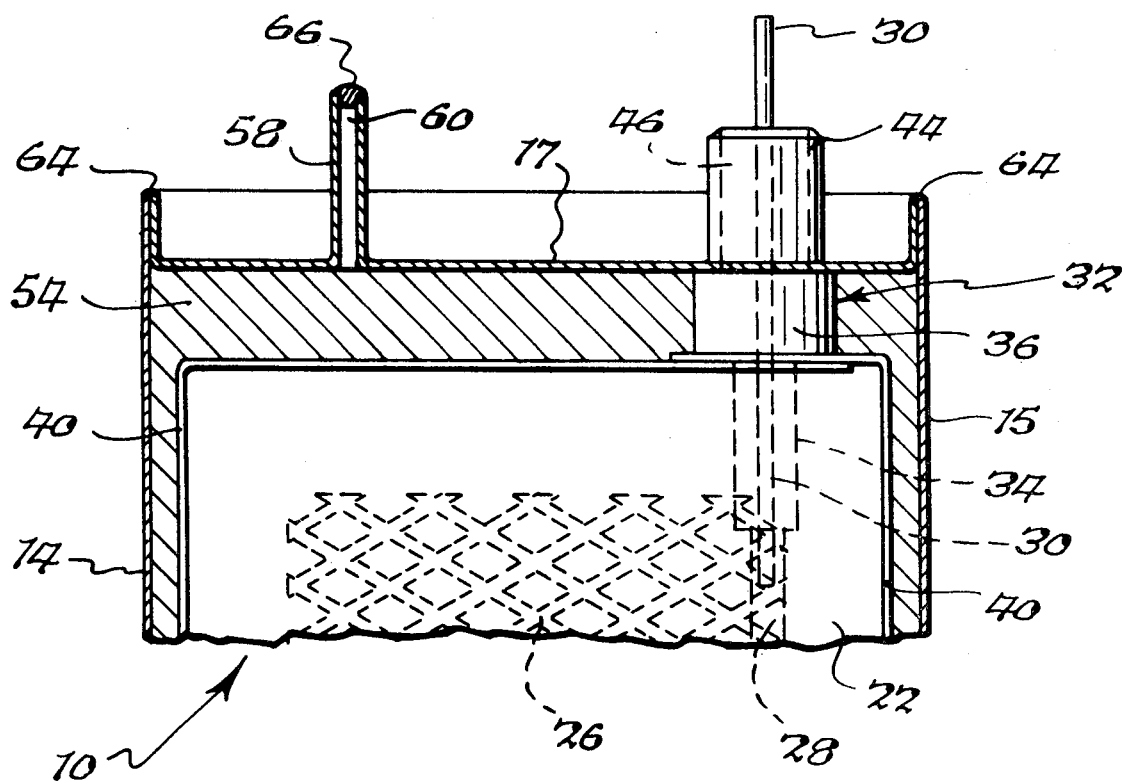
FIG. 3 is a fragmentary vertical sectional view with parts shown in elevation of the cell of FIG. 1.

Referring now to FIGS. 2 and 3, the cell of the present invention further includes anode means comprising a pair of lithium elements or plates 22, 24 having an anode current collector element 26 sandwiched or positioned therebetween. As shown in detail in FIG. 3, current collector 26 is a relatively thin, preferably a sheet of no. 12 mesh zirconium metal. A conductor strip 28 of nickel or suitable metal is spot welded to collector element 26 along one edge thereof, and an electrical conductor 30 which can be of nickel, platinum or suitable metal is welded at one end to the strip 28 and is of sufficient length allowing it to extend out from the casing for making external electrical connection thereto. Conductor 30 is sealed from the remainder of the cell by means including an insulator element generally designated 32 which surrounds lead 30 and has a first portion 34 which is sandwiched between the lithium plates 22, 24 and a secondor body portion 36 which is cylindrical and located between the lithium plates and lid 17 when the cell is completed. The insulator 32 is of a material which in addition to being a non-conductor of electricity also is non-reactive with bromine. One form of material found to perform satisfactorily is a fluoropolymer material commercially available under the name Halar, a trademark of the Allied Chemical Company. Of course, other materials having these characteristics can be used for the insulator 32.

The anode assembly comprising the lithium elements 22, 24 and current collector 26 is fitted within an anode holding means or frame in the form of a strap 40 which embraces the anode assembly in a manner exposing at least one lithium surface. Strap 40 is of the aforementioned Halar material or any similar material which is non-reactive with bromine. In the present illustration, strap 40 surrounds the peripheral edges of the lithium elements or plates 22, 24 in a snug, sealing relationship. The opposite ends of strap 40 are provided with apertures of a size sufficient to receive the insulator portion 34, and these ends are overlapped adjacent the insulator portion 34 as shown in FIG. 3. A ferrule 44 of metal such as stainless steel encloses a further portion of lead 30. Ferrule 44 is threaded at one end (not shown) and is connected into insulator portion 36, the inner surface of which also is threaded. Ferrule 44 is of generally hollow cylindrical shape, and the region between ferrule 44 and conductor 30 is filled by a glass seal 46 formed therein to provide a metal-glass hermetic seal.

One illustrative method of forming the anode assembly is as follows. First there is provided a subassembly including lead 30 within the combination of insulator 32 and ferrule 44. Strap 40 then is assembled into place with the ends overlapped to align the openings therein which then are fitted onto insulator portion 34. The overlapping ends joined to insulator portion 34 can be sealed in place with a suitable cement which is non-reactive with bromine such as a cyanoacrylate cement commercially available under the name Permabond 101. Similarly, the junction between insulator portion 36 and the bottom portion of ferrule 44 can be cemented. Current collector 26, conducting strip 28 and the end of lead 30 are spot welded together whereupon the lithium plates 22, 24 are positioned within strap 40 on opposite sides of the collector element 26 and insulator portion 34. The subassembly then is placed within a suitable fixture or support and is pressed together with a suitable force, for example about 3,000 lbs. The current collector 26, strip 28, insulator portion 34 and the portion of lead 30 contained therein are sealed within the lithium elements 22, 24. The material of strap 40 is pressure bondable to lithium with the result that the peripheral juncture at the edges of the lithium elements 22, 24 is enclosed or sealed by the strap 40. If desired, the junction between the inner surface of strap 40 and the periphery of lithium elements 22, 24 can be sealed further by the aforementioned cement. The completed anode assembly thus has two exposed surfaces which are oppositely directed or disposed.

When the anode assembly is completed, the exposed surfaces of lithium elements 22 and 24 are provided with coatings 48 and 50, respectively, of an organic electron donor component material, and the nature of the coatings 48, 50 and their role in the cell of the present invention will be described in further detail presently. The completed anode assembly is positioned in casing 10 as shown in FIGS. 2 and 3, with the anode operative surfaces spaced from the inner surface of casing 10.

The cell of the present invention further comprises a bromine cathode including a region of cathode material 54 within casing 10 and operatively contacting the exposed surfaces of the lithium elements 22, 24 and operatively contacting the inner surface of casing 10. Casing 10, being of electrically conducting material, serves as a cathode current collector. According to a preferred mode of the present invention, the cathode material 54 comprises the reaction product of liquid bromine and an organic electron donor material. In particular, the cathode material 54 preferably comprises a charge transfer complex of bromine and an organic electron donor component material. A preferred form of the organic electron donor component is polyvinyl pyridine polymer and in particular two-vinyl-pyridine polymer.

The cell of the present invention further comprises an element 58 on the casing and having a passage 60 therethrough which at one end thereof is in communication with the interior of casing 10 and which at the other end is externally exposed. In particular, element 58 is in the form of a metal tube fixed to lid member 17. Tube 58 preferably a separate element which is fitted at one end into an aperture provided through lid 17 and welded thereto. Alternatively, the lid 17 and tube 58 could be formed integrally from a single piece of metal. Lid member 17 is fitted into place in the open end of the casing and is welded at 64 around the peripheral edge thereof to the corresponding edge of the casing. In making the cell according to the method of the present invention, bromine is introduced through passage 60 in the filling element 58 to the interior of the casing and into operative relationship with the lithium anode. Then passage 60 is closed by suitable means, for example an element 66 which can be a plug of material which is non-reactive with bromine and which is sealed in place by suitable non-reactive cement. Other arrangements for closing passage 60 can of course be employed. The metal tube 58 preferably of nickel also serves as an electrical terminal inasmuch as the casing 10 serves as a cathode current collector.

Figure 4:
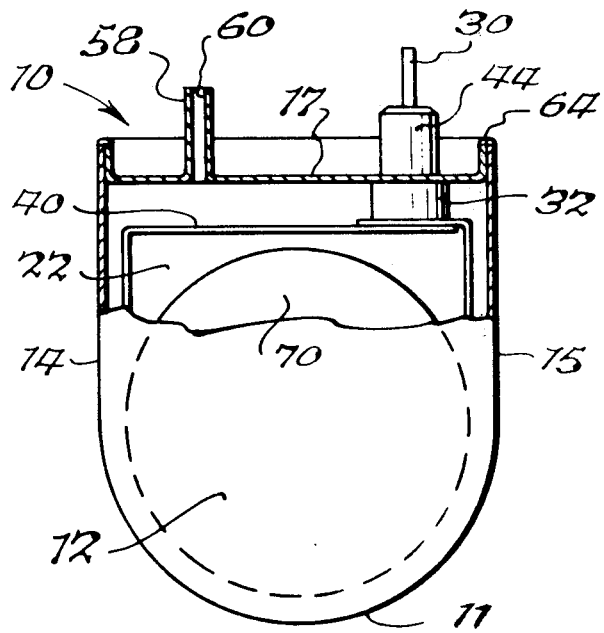
FIG. 4 is a side elevational view with parts removed illustrating a cell at one stage in the method of the present invention.
Figure 5:
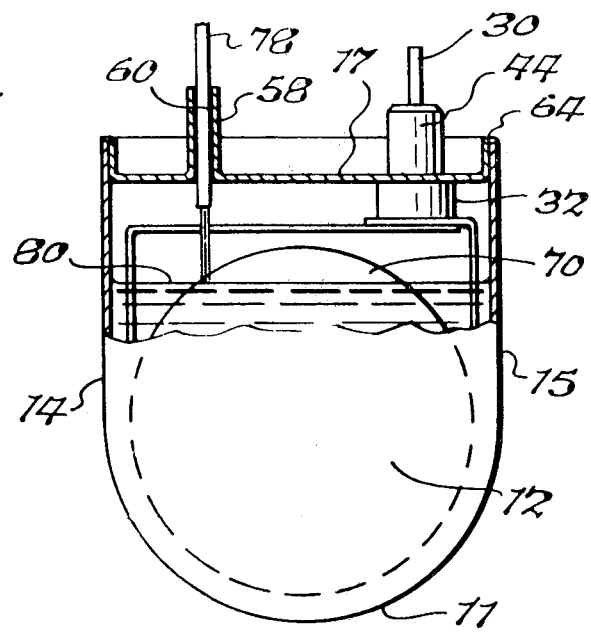
FIG. 5 is a side elevational view with parts removed illustrating a cell at another stage in the method of the present invention.
Figure 6:
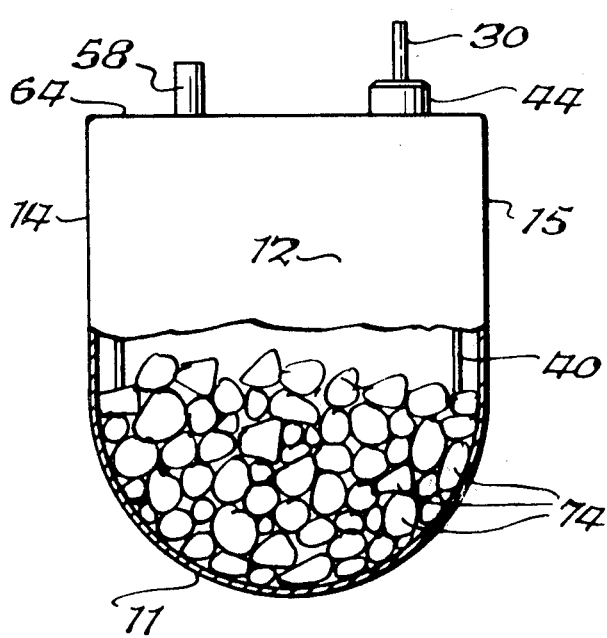
FIG. 6 is a side elevational view with parts removed illustrating a cell at a stage in the method according to another embodiment of the present invention.

FIGS. 4-7 illustrate the method according to the present invention for making the lithium-bromine cell illustrated in FIGS. 1-3. FIG. 4 illustrates a cell at a stage of the method prior to introduction of bromine. Thus, there is provided the casing 10, preferably of electrically conducting material such as stainless steel, and the lithium anode means in the casing including the pair of lithium plates, the one plate 22 being shown in FIG. 4, surrounded by the strap or frame 40 at the peripheral edges thereof and having the anode electrical conductor 30 extending therefrom and out through the casing being enclosed and insulated by the insulator element 32 and ferrule 44. The exposed or operative surfaces of the lithium plates are coated with an organic electron donor material as previously described. According to a preferred mode of the present invention, an organic electron donor material is introduced into operative relationship with the lithium anode means prior to introducing bromine. An organic electron donor material found to perform satisfactorily is polyvinyl pyriding polymer, in particular two-vinyl pyridine polymer, and as shown in FIG. 4 the material is in the form of a pellet or wafer, one of which is designated 70 in FIG. 4. It is preferred to include two such pellets or wafers in a cell, one adjacent each exposed face of the lithium anode. By way of example, in a cell wherein the total weight of lithium is about 1.04 grams, each pellet or wafer has a weight of about 0.5 gram and is of a size having an outer diameter of about 1 3/32 inches and a thickness of about 0.035 inch. Alternatively, the organic electron donor material can be introduced in the form of crystals generally designated 74 in FIG. 6 placed in the cell in a measured quantity adjacent both sides of the lithium anode.

After the organic electron donor material is placed in casing 10 in operative relationship with the lithium anode, the casing is sealed in a manner such that the filling element or tube 58 is fixed to the casing with one end of the passage 60 in communication with the interior of the casing and the other end externally exposed. As illustrated in FIG. 4, the filling element 58 is fixed to lid 17, which, in turn, is fitted into the open end of casing 10 with the aperture in the lid receiving ferrule 44 upon whereupon the lid is sealed to the casing by means of the weld 64 as previously described.

Figure 7:
FIG. 7 is a fragmentary elevational view illustrating an alternative means closing the filling element in the cell of the present invention.

The next step in the method of the present invention is introducing bromine through passage 60 in the filling element 58 to the interior of the casing into operative relationship with the lithium anode. In particular, a small diameter tube or conduit 78 leading from a supply of bromine (not shown) is placed in fluid communication with passage 60, and in the present illustration tube 78 is inserted into and along with element 58 so that the open end of the tube 78 is within the casing 10. Liquid bromine in a measured quantity or volume is conveyed from the supply through the tube 78 into the casing 10, the level of bromine at this illustrative stage of the method being designated 80 in FIG. 5. Tube 78 can have an outer diameter such that it fits relatively snugly within the passage 60 to prevent or minimize escape of bromine vapors from within casing 10 to the outside. If desired, the tube 78 can carry a suitable seal for engaging the end of filling element 58. One illustrative form of supply and dispenser is a hypodermic syringe where conduit 78 is the needle thereof. The amount of liquid bromine introduced to casing 10 generally will be sufficient to at least cover the exposed surface of the lithium plates, and often will be filled to a level above the anode assembly and below the lid 17. After the predetermined amount of bromine is introduced to casing 10, conduit 78 is removed from the filling element 58 and the passage 60 is closed as previously described. Another means for closing tube 58 is illustrated in FIG. 7 wherein the outer end is pinched or otherwise mechanically formed into a flatened, clamped portion 84 which then can be further sealed by welding.

The liquid bromine in casing 10 reacts at room temperature with the organic electron material, i.e. poly-2-vinyl pyridine, and the reaction product is a charge transfer complex of an organic electron donor component, i.e. poly-2-vinyl pyridine, and bromine. Thus, the bromine-containing cathode material is formed in casing 10 upon introduction or injection of bromine to the interior thereof.

The lithium-bromine cell according to the present invention operates in the following manner. As soon as the bromine-containing cathode material, for example the cathode material 54 in FIGS. 2 and 3, operatively contacts a lithium element, a solid lithium-bromine electrolyte begins to form at the interface. In the present illustration this occurs at the outer or oppositely-disposed surfaces of the two lithium elements 22 and 24. An electrical potential difference will exist between the anode lead 30 and the cathode terminal 58 because casing 10 is of electrically conductive material and operatively contacts the bromine-containing cathode material to serve as a cathode current collector. The mechanism by which the foregoing is accomplished is believed to include migration of lithium ions through the electrolyte whereby lithium is the ionic species in the cell.

The method of the present invention is efficient, effective, relatively easy to perform, and utilizes bromine in its natural or uncombined form as a starting product. Liquid bromine is introduced through a passage in a filling element to the interior of a sealed casing containing other cell components wherein the bromine-containing cathode material, i.e. a charge transfer complex of poly-2-vinyl pyridine and bromine, is formed in situ. Introducing or injecting bromine into a sealed casing, i.e. after the casing lid is welded in place, avoids release of bromine vapor to the surroundings thereby preventing contamination of the atmosphere with bromine vapor and preventing interference of the bromine vapor with the weld.

In the cell of the present invention all parts of the anode current collector 26 and conductor 30 are shielded or sealed from cathode material 54 and from the metal casing 10, 17. As a result, no insulation is needed between the cathode material 54 and the metal casing thereby enabling the metal casing 10, 17 to contact the bromine-containing cathode material and function as a very large cathode current collector. This improves cell performance and increases theoretical energy density due to the relatively large amount of cathode material in contact with the current collector. Another advantage of the foregoing arrangement is that by having the filling element 58 of electrically conducting material, after injection of bromine and the closing of passage 60, the element provides another important function in serving as a cathode electrical terminal for the cell.

Table I presents electrical data obtained from a lithium-bromine cell according to the present invention as a function of cell life in hours. For example, the data entered in the first row of Table I was obtained sixteen hours after the cell was placed in operation. The impedance quantities indicate impedance measured at 100 hertz, add impedance measurements were made with a 100 kilohm resistance connected in parallel with the cell under test.

TABLE I

| Cell Life In Hours | Open Circuit Voltage In Volts | Cell Impedence In Ohms |
| --- | --- | --- |
| 16 | 3.373 | 90 |
| 64 | 3.417 | 76 |
| 88 | 3.422 | 81 |
| 112 | 3.424 | 84 |

The cell from which the foregoing data was obtained included a total lithium weight of about 1.2 grams and a total weight of about 1.0 gram for two pellets of poly-2-vinyl pyridine. The weight of the anode assembly was 2.24 grams prior to coating and 2.28 grams after coating. The completed cell weighed 13.09 grams before introduction of bromine and 27.03 grams after introduction of bromine. This net weight of 13.94 grams bromine at 0.335 ampere-hours per gram energy density for bromine gives a stoichiometric energy capacity of 4.6 ampere hours. At a utilization rate of 76 percent, the cell has a nominal energy capacity of 3.5 ampere hours. With an output voltage of 3.4 volts and a cell weight of 27 grams, the energy density of the cell is 450 watt-hours/kilogram $$\left[\frac{3.4 \text{ volts} \times 3.5 \text{ ampere hours}}{27 \text{ grams}}\right].$$

The weight ratio of bromine to organic electron donor material, i.e. poly-2-vinyl pyridine, in the completed cell is 13.94 grams: 1:04 grams or 13.3:1.

It is important that the bromine-containing cathode material 54 is not allowed to come in contact directly with any portion of the electrical conducting means connected to the lithium elements of the anode, in particular anode current collector 26 and leads 28, 30. Otherwise, this will cause an electronic conduction between the cathode material 54 and the anode current collector 26 or leads 28, 30 creating an electrical short circuit condition in the cell. In particular, any migration of the bromine-containing cathode material 54 directly to anode current collector 26 or directly to leads 28, 30 instead of first reacting with a lithium element of the anode will result in a condition of electronic conduction thereby creating a short cicruit in the cell. On the other hand, when the bromine-containing material 54 contacts only the lithium portion of the anode this gives rise first to a condition of ionic conduction and results in proper cell operation.

In the cell of the present invention, all parts of the anode current collector 26 and leads 28, 30 are sealed from cathode material 54 and from the metal casing. Anode current collector 26 and its connection through strip 28 to lead 30 are sealed within the sandwiched or pressure bonded assembly of lithium plates 22, 24. This seal is enhanced by the strap 40 which is of Halar or similar material which is non-reactive with bromine.

The foregoing arrangement together with the provision of insulator 32 and ferrule 44 with glass seal 46 provides an anode structure which is completely sealed with the exception of the oppositely-directed operative lithium surface portions of the anode which are available to the cathode material 54. All parts of anode current collector 26 and leads 28, 30 are shielded from the cathode material and from the cell casing. Furthermore, the sealed anode assembly can be completed before the entire cell is assembled for efficiency in manufacturing. The foregoing advantages are provided in a cell which is relatively simple in construction.

The material of coatings 48 and 50 on lithium elements 22 and 24, respectively, is an organic electron donor material of the group of organic compounds known as charge transfer complex donors. The material of the coatings can be the organic electron donor material introduced into the cell casing prior to introducing bromine which then reacts to form the charge transfer complex of the cathode material 54, but other materials can be employed. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinylpyridine present in the range from about 10% to about 20% by weight with a strength of about 14% by weight of 2-vinyl-pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10% the resulting coating can be undesirably too thin and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing procedure can be repeated to provide multiple coatings or layers, for example three, on each lithium plate.

It is therefore apparent that the present invention accomplishes its intended objects. While several embodiments of the present invention have been described in detail, this is for the purpose of illustration, not limitation.

We claim:

1. A method of making a lithium-bromine cell comprising the steps of:
   (a) providing a casing of electrically conducting material;
   (b) placing lithium-anode means in said casing;
   (c) providing a filling element having a passage therethrough;
   (d) fixing said filling element to said casing with one end of said passage in communication with the interior of said casing and the other end externally exposed;
   (e) sealing said casing;
   (f) introducing bromine cathode material through said passage in said filling element to the interior of said casing into operative relationship with said lithium anode means to form a solid lithium bromide electrolyte between said lithium anode means and said bromine cathode material and into operative relationship with said casing to cause said casing to serve as a cathode current collector; and
   (g) closing said passage of said filling element.

2. A method according to claim 1, wherein said casing is of the type having an opening at one end closed by a lid member sealed thereto, said lid member having an opening therein, and wherein said step of providing said filler element comprises fixing said filler element to said lid with said passage in communication with said lid opening.

3. A method according to claim 2, wherein said casing is sealed by welding said lid to said casing.

4. A method according to claim 1, wherein said filling element is in the form of a tube and said passage is closed by sealing the exposed end of said tube.

5. A method according to claim 4, wherein said tube is of metal and the exposed end is sealed by pinching and welding.

6. A method according to claim 1, wherein said bromine is introduced in liquid form.

7. A method according to claim 1, further including introducing an organic electron donor material into operative relationship with said lithium anode means prior to introducing bromine.

8. A method according to claim 7, wherein said organic electron donor material comprises polyvinyl pyridine polymer.

9. A method according to claim 7, wherein said organic electron donor material is solid in form and placed in said casing adjacent said lithium anode.

10. A method according to claim 9, wherein said organic electron donor material is in the form of a solid wafer of poly-2-vinyl-pyridine.

11. A method according to claim 7, wherein said organic electron donor material comprises poly-2-vinyl pyridine and wherein the ratio by weight of bromine to poly-2-vinyl pyridine is about 13:1.

12. A method according to claim 1, wherein said anode means comprises a lithium element having an exposed surface adapted to operatively contact said bromine, and further including the step of applying to said surface a coating of an organic electron donor material prior to said step of introducing bromine.

13. A method according to claim 12, wherein said organic electron donor material comprises polyvinyl pyridine polymer.

14. A method according to claim 1, wherein said filling element is of electrically conducting material and wherein said step of closing said passage is performed in a manner causing said filling element to serve as an electrical terminal for said cell.

* * * * *